Nov. 21, 1939.  E. T. DAHL  2,180,844
LIQUID LEVEL CONTROL DEVICE
Filed Oct. 2, 1936  2 Sheets-Sheet 1
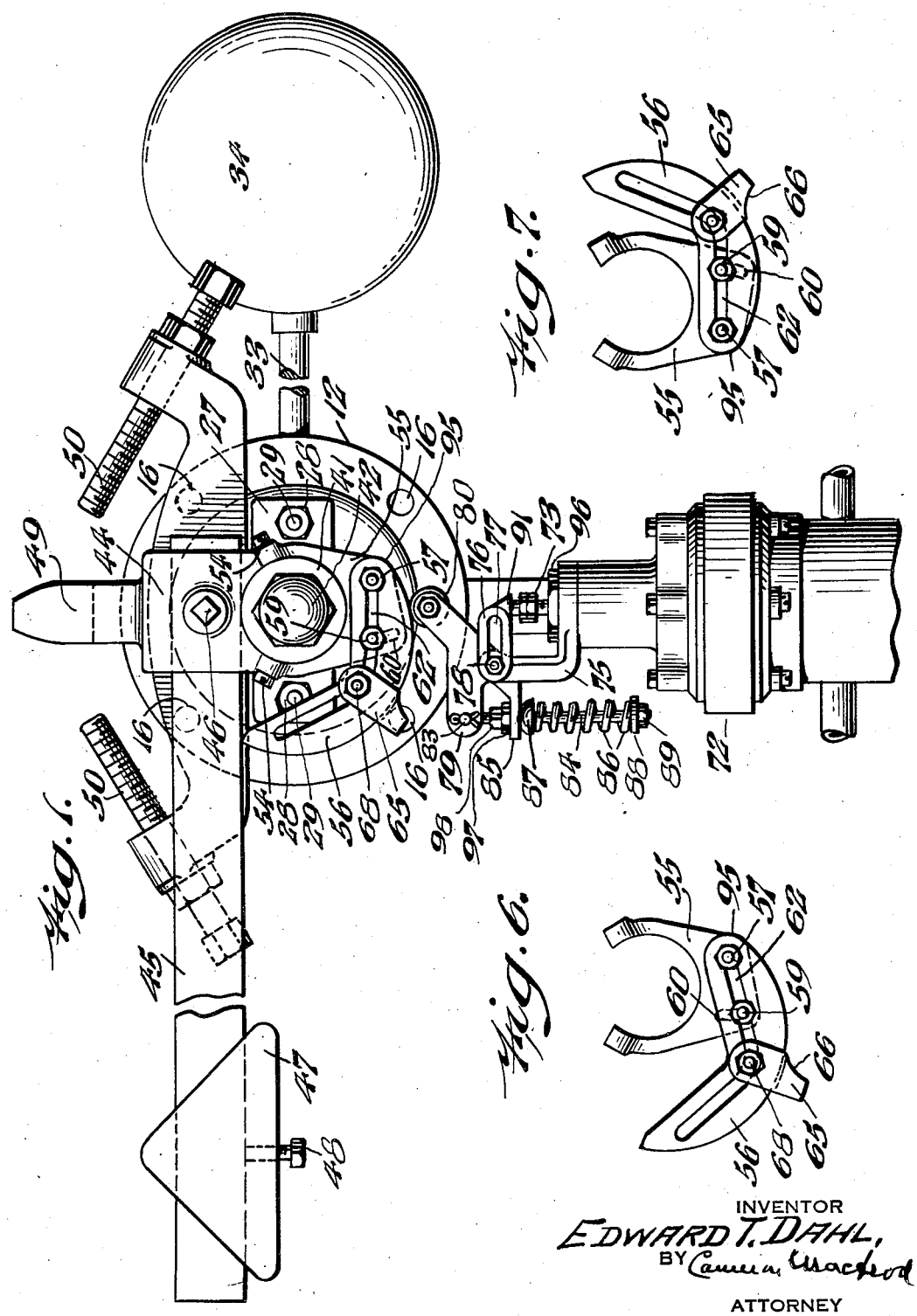
INVENTOR
EDWARD T. DAHL,
BY Cameron MacLeod
ATTORNEY Nov. 21, 1939.  E. T. DAHL  2,180,844
LIQUID LEVEL CONTROL DEVICE
Filed Oct. 2, 1936  2 Sheets-Sheet 2
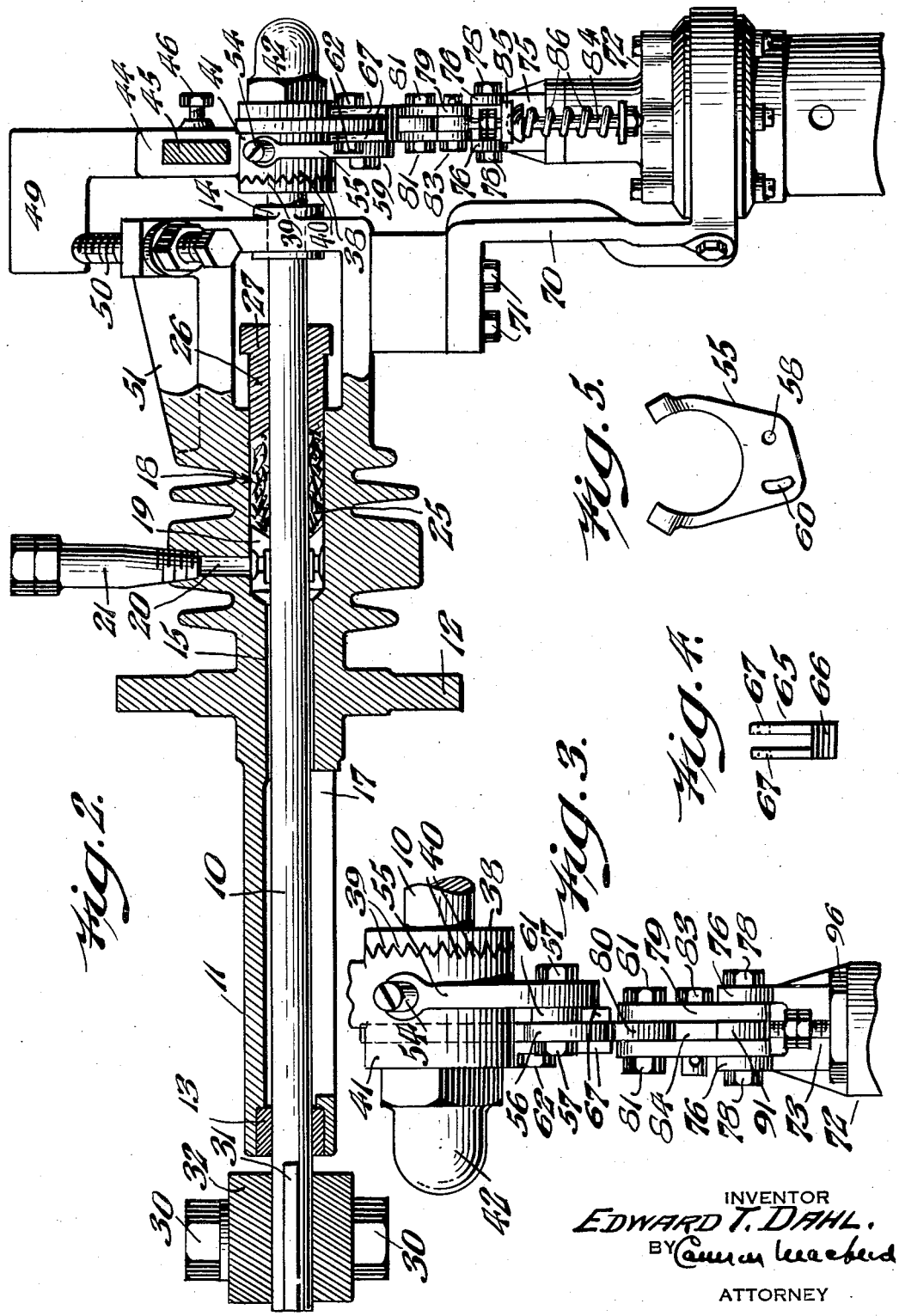
INVENTOR
EDWARD T. DAHL.
BY
ATTORNEY Patented Nov. 21, 1939

2,180,844

UNITED STATES PATENT OFFICE 2,180,844

LIQUID LEVEL CONTROL DEVICE

Edward T. Dahl, Abington, Mass., assignor to Eldon Macleod, Cameron Macleod, Leslie Soule, Sullivan A. Sargent, Jr., Herbert A. Stebbins, and Frank A. Morrison, trustees, doing business as Mason-Neilan Regulator Company, Boston, Mass.

Application October 2, 1936, Serial No. 103,709

17 Claims. (Cl. 137—104)

This invention relates to a device for regulating liquid levels and, more particularly, to means for controlling in a container the liquid level in response to the actuation of a plunger operated pilot valve.

Prior art structures generally are characterized by the interposition between a float, responsive to variations in a liquid level, and a pilot or other valve, of a loosely linked system of levers. Such constructions usually not only are built for individual installations to meet conditions but also either lack completely adequate means for adjustment between parts or develop an amount of play that makes accurate adjustment impossible.

The present invention contemplates the interposition, between a float responsive to variations in a liquid level, and a pilot valve, of a cam operatively connected to the actuating member of the pilot valve, together with locked connections including a cam shaft between the cam and the float. Additionally, means are contemplated for adjusting the centric relationship between the position of the float and the cam so that at any predetermined position of the float a predetermined position of the cam may be provided and vice versa. Also means are contemplated for adjusting the position of the cam with respect to the position of the actuating member of the pilot valve so that either a greater or lesser movement of the plunger arm may result from two identical movements of the float, and of the shaft upon which both the float and the cam are mounted.

The present invention also contemplates, in addition to the operative adjustments mentioned above, what may be called set-up adjustments comprising means for positioning either or both the cam and the float on opposite sides of the cam shaft so that the control device may be connected to a liquid container lying on either side thereof and so that a rotation of the shaft, due to movement of the float, may, as desired, cause either an upward or downward movement of the pilot valve plunger.

A primary object of the invention is to provide a liquid level control device which is adjustable under operating conditions to accomplish the following results either jointly or singly: (a) vary the relationship between the level at which the float is positioned and the position of the plunger of the pilot valve so that the float at any of a number of different levels has the same relationship to the plunger position; (b) vary the relationship of the cam to the plunger so that any one of a number of desired plunger positions may be obtained at a predetermined float position; (c) vary the position of the cam with respect to the plunger so that either an upward or a downward movement of the plunger may result from the same float movement; and (d) vary the position of the cam with respect to the plunger so that an accelerated or decelerated movement thereof may be obtained while the float movement remains constant.

Another object of the invention is to provide a liquid level control unit which may be connected in a number of different positions to a container for liquids.

A further object of the invention is to provide a device capable of carrying out any of the above objects which may be readily adjusted, is of simple and inexpensive construction, is relatively free from play and which is capable of operation with a minimum of friction.

Yet another object of the invention is to provide a liquid level control device having a novel construction, arrangement and combination of elements whereby the above and other objects are attained.

Further advantages and objects of the invention will be apparent from the following specification, claims and from the drawings in which:

Fig. 1 is an end elevation of a liquid level control device embodying the invention;

Fig. 2 is a view partially in section and partially in side elevation of the device shown in Fig. 1;

Fig. 3 is an enlarged side elevation, taken from the side opposite to that of Fig. 2, of the end of the cam shaft and the parts carried thereby;

Fig. 4 is a detailed end elevation of an auxiliary cam member;

Fig. 5 is a detailed side elevation of a yoke on which the cam is mounted and by which it is connected to the cam shaft;

Fig. 6 is a detailed side elevation of the cam, auxiliary cam and cam yoke assembly; and Fig. 7 is a view similar to that of Fig. 6 but with the elements positioned on the opposite hand.

Referring now particularly to Figs. 1 and 2, a cam shaft 10 may be mounted in a longitudinal hollow housing 11 formed with a flange 12 thereon intermediate its ends, cam shaft bearings 13 and 14 at opposite ends thereof and an intermediate cam shaft guide 15 adjacent the flange 12. Holes 16 drilled in the flange 12 provide means whereby bolts may connect the housing either directly to the side of a liquid container such as a tank in which it is desired to regulate the liquid level or indirectly thereto by means of a conventional kidney float chamber (not shown) so that the left end (Fig. 2) of the housing 11 and the parts carried thereby may lie within the container. A slot 17 may be provided for draining this part of the housing into the container. To the right, as viewed in Fig. 2, of the flange 12 the diameter of the hollow portion of the casing may be greater, as at 18, than the other portions thereof and may carry a grease ring 19 which may be lubricated through a passage 20 connecting with a lubricator 21. To prevent seepage along the cam shaft 10, packing 25 may be placed around the shaft in the bore 18 and held under pressure therein against the shaft 10 and the grease ring 19 by a sleeve 26 encircling the shaft and having a T-shaped head 27 by which it is connected to the housing by nuts 28 (Fig. 1) threaded on studs 29. The left end of the cam shaft 10 may have secured thereto, beyond the bearing 13, as by the clamping nut and bolt 30 and key 31 the end 32 of a float arm 33 carrying a float 34. Thus, with the float positioned on the top of liquid in a container, a variation in the level of the liquid will result in the rising or falling of the float and a simultaneous rotation of the cam shaft 10.

Near the right end of the cam shaft 10, on a portion of the shaft extending beyond the bearing 14, a collar 38 may be fixed, as by welding, to prevent movement thereof with respect to the shaft and may carry on the surface facing away from the bearing 14 a series of teeth 39 adapted to mesh with teeth 40 on a detachable collar 41. Except for the interlocking of the teeth, the detachable collar 41 may be rotated with respect to the cam shaft 10 but this rotation may be prevented, except when desired, by a nut 42 in threaded engagement with the end of the cam shaft 10 which holds the teeth on the free collar in mesh with those on the fixed collar 38. Since, as illustrated, not only is the end 32 of the float arm 33 keyed to the shaft 10 but also these elements, when properly positioned, lie within a preferably closed tank, a relative change of position between the float arm and the shaft is difficult. It being desirable that the elements, hereinafter described, carried by the detachable collar 41 have a predetermined and variable relationship with respect to the position of the float arm about the cam shaft as an axis and vice versa, the interlocking tooth arrangement above described provides a means for readily accomplishing such adjustment.

Formed integrally with the detachable collar 41 may be an arm 44 slotted at its lower end to carry a balancing lever 45 which may be secured in the slot by the set screw 46. On the free end of the lever 45 a balancing weight 47 may be movably positioned as by the set screw 48. A finger 49 extending upwardly from the arm 44 may provide means for engagement with a pair of oppositely positioned adjustable lock screws 50, 50, carried by a bracket 51 on the housing 11 above the bearing 14, to prevent overrange movement of the cam shaft 10 and of the elements carried thereby.

Screws 54, 54, threaded into holes with their axes at a common angle to the horizontal but oppositely positioned in the detachable collar 41 may detachably connect to the collar a yoke 55 having plane parallel major surfaces. With this construction the yoke may be turned side for side. Adjustably secured to the yoke 55 as by a bolt and nut 57 passing through a hole 58 in the yoke and by another bolt and nut 59 passing through a slot 60 in the yoke is a cam 56 which has plane parallel major surfaces and a slot 62 through which both the bolts 57 and 59 pass. The cam may be spaced from the yoke 55 by a washer 61 if desired. Thus the cam 56, similarly to the yoke 55, may be turned from side to side.

A detachable auxiliary sliding cam 65 (Fig. 4) having a cam surface 66 and two parallel arms 67, 67, extending upwardly therefrom may, if desired for purposes hereinafter described, be connected to the cam 56 by a nut and bolt 68 passing through aligned holes in the arms 67, 67, and through the slot 62 in the cam 56.

Depending from the cam shaft housing 11 to which it may be connected by screws 71 is a bracket 70 adapted to carry a pilot valve 72 which may be adjusted in the bracket about its own axis. The pilot valve 72 is not herein described as it may be any one of numerous types commonly known. Preferably, however, it may be one of the type having a vertically reciprocable actuating plunger 73 which is resiliently pressed toward one position by the action of an internal spring and in which a departure from that position causes a variation in the operation of a mechanism controlled thereby.

A bracket 75 extending upwardly from the pilot valve 72 may carry, in a pair of horizontal arms 76, 76, having parallel slots 77 therein, a nut and bolt 78 acting as a fulcrum for a bell-crank lever 79. The bell-crank lever 79 may be formed of two parallel members providing a slot within which at its upper end a cam roller 80 may be mounted on a bolt 81. At the other end of the bell-crank lever 79 and within said slot a rod 84 is mounted on a suitable transverse pin 83 passing through both parallel members of the bell-crank lever 79. The rod 84 may extend downwardly through an opening in an arm 85, said arm being pivotally mounted between the parallel members of the bell-crank lever 79, on the bolt 78, and having integral therewith a finger 91 adapted to contact plunger 73 as shown. The lower end of the rod 84 may be provided with an expansion spring 86 mounted between upper and lower washers 87 and 88 respectively, the upper washer bearing against the under side of the arm 85 on the bracket 75 and the lower washer being held in position on the rod 84 by a nut 89. Thus at all times the spring tends to pull downwardly the end of the bell-crank lever 79 to which it is connected and maintain the cam roller 80 always in contact with the cam 56 as a result of the upward thrust of the plunger 73 on the finger 91. A nut 97 and suitable lock nut 98 is provided on the rod 84 to adjustably limit the downward movement of the rod 84 whereby the bell-crank lever 79 may be adjusted relatively to the pilot plunger 73 if desired, the nuts providing in effect a vernier adjustment and the spring operated plunger 73 affording yielding means for maintaining the roller 80 in contact with the cam 56.

From a consideration of the drawings and the above description it will be apparent that the arangement of several elements may be varied not only to permit a number of physical arrangements of the control to allow for differing conditions of plant design and requirements, but also readily to make varied adjustments to meet accurately the different requirements of plant operation. It may be required that the float be arranged as shown in Fig. 1, and that a drop in liquid level should cause the pilot valve plunger 73 to rise to effect the necessary change of inflow to or outflow from the container by a suitable servo motor. In such case a drop in liquid level and corresponding float movement will impart to the shaft 10 and cam 56 a clock-wise motion permitting the plunger 73 to move upward as determined by the finger 91.

On the other hand it may be necessary, with the float still as shown, that a downward movement of the plunger be required to effect the results just above referred to. To meet this condition the cam 56 is removed from the yoke 55 by freeing the bolts 57 and 59, the screws 54 are removed and the yoke 55 is turned over to position shown in Fig. 7, with the slot 60 to the right, and is thereafter made fast. The cam 56 is then turned over to position shown in Fig. 7, and reconnected to yoke 55 by means of bolts 57 and 59, and bracket 75 is rotated about its vertical axis 180 degrees to reverse the position of the cam roller 80 and connected parts by loosening lock nut 96. It will be apparent that this arrangement of parts results in a downward movement of the pilot valve plunger 73 on a drop in liquid level instead of an upward movement as herein above described.

Again the mounting of the control may require the float 34 to be on the opposite hand to that shown in Fig. 1, that is to the left of the cam shaft 10. To accomplish this the nut 42 is loosened and teeth between free collar 41 and fixed collar 39 disengaged to permit relative movement between cam shaft 10 and collar 41. The float is then positioned to the left by rotating the cam shaft, and balancing lever 45 is freed by releasing set screw 46 and again made fast with weight 47 to opposite hand from that shown in Fig. 1. As thus arranged a lowering of the float 34 will cause the plunger 73 of pilot valve 72 to be depressed and rising of the float will permit the plunger to rise. Here again relative movements of float 34 and plunger 73 may be reversed, if desired, in the manner herein above described.

In operation it is frequently desirable to make a number of adjustments in the control device to meet varying conditions. First, it may be desirable to have the normal or zero position of the float somewhat out of the horizontal. This may be accomplished by loosening the nut 42, disengaging the teeth on the free collar 41 from the teeth 39 on the fixed collar and rotating the cam shaft 10 to place the float at the desired position. Thereafter the teeth may be again placed in engagement with each other and the nut 42 retightened.

Inasmuch, however, as the distance travelled by the plunger of the pilot is a function of the opening of the valve controlling the liquid level, any change in the position of the pilot plunger will effect a change in the level of the liquid which carries the float. An approximate adjustment to the control of proper float level may be made as described preceding placing the system to be controlled in operation. To enable the control of a definite line of liquid level, a vernier adjustment is provided by regulating nut 97 on rod 84 to vary the distance between the contact of finger 91 and the contact surface of roller 80. In this manner an accurate adjustment may be obtained of the relative position of the float 34 and pilot plunger 73, and therefore an accurate setting of the line of liquid level.

It often becomes necessary under many process conditions to sacrifice exact liquid level control in favor of more or less varying liquid levels to satisfy chemical or mechanical reactions or lags in the process. To meet these conditions I have provided the cam 56, as herein above described, with slot 62 and the yoke 55 with slot 60 which makes it possible to adjust the relative movements of the float 34 and the pilot plunger 73. The cam 56 may be adjusted as shown in Figs. 1, 6, and 7, in an eccentric position or may be moved to the right from the position shown in Fig. 1, to a concentric position, or to any intermediate point. It will be noted, therefore, that by adjusting cam 56 relative to bolts 57 and 59 in slot 62 the amount of relative movements of plunger 73 and float 34 may be readily varied to meet conditions. When the cam 56 is adjusted to approach the concentric position a greater movement of the float 34 is required to move the pilot plunger a given amount, and, on the other hand, as the cam 56 is adjusted to a more eccentric position the movement required by the float to move plunger 73 said given amount is decreased.

The amount of motion of the float required to produce full throttling of the control valve is commonly termed the throttling band. Therefore the throttling band may be altered to meet many conditions by adjusting the cam as just described. In some instances, however, where a very narrow throttling band is necessary to meet process conditions, the cam is moved to the position indicated in Fig. 6, namely, to the extreme left so far as is permitted by slot 62, and with bolt 59 at the lower end of slot 60. This adjustment affords a maximum movement of the pilot plunger 73 from a minimum movement of the float 34, and accordingly a sensitive control.

The adjustments herein above described are suitable for process level control where the function of the float movement is in a uniform ratio to servo motor and flow control. There are other process conditions, however, which require different characteristics, as for example where it is desired to permit a relatively large liquid level variation without variation of the servomotor or control valve unless the liquid level exceeds the allowable variation at which time the control valve must function rapidly in order to prevent the liquid level variation from exceeding established limits. To make this clear let us assume it is desired to have the control valve in half open position throughout the allowable liquid level variation. This may be obtained by making the following adjustments:

First, place the cam 56 in a concentric position and depress the plunger 73 by means of the Vernier adjustment 97 to its mid-position. Second, adjust the auxiliary cam 65 the proper distance from the heel 95 of the cam 56 to establish the same angular required motion of the cam 56 to the allowable angular motion of the float rod 33. Third, shift adjustable collar 41 so that the roller 80 is midway between the auxiliary cam 65 and the heel of cam 56 when the float is midway of the allowable liquid level variation.

It will be apparent from the above description that the concentric adjustment of the cam 56 permits the float to move throughout the entire allowable band without changing the position of plunger 73 and accordingly that of the control valve. If, however, the level exceeds the allowable band the auxiliary cam 65 will contact the roller 80 and depress the plunger when the float rises beyond the desired amount, or, if the level drops below the allowable band, the plunger will rise when the roller 80 passes over the heel 95 of the cam 56.

Without further description it will be readily understood that the cam 56 may be adjusted eccentrically as much as desired to afford the required throttling action of the control valve within the allowable level band. It is also understood that the cam surfaces may be varied as desired to meet special process conditions.

The control device herein shown and described is of simple and inexpensive construction, is capable of easy and accurate adjustment, and may be readily adapted to various physical structures and process requirements. It will be further understood that modifications may be made in the invention as above described without departing from the spirit and scope thereof, as set forth in the following claims.

What is claimed is:

1. In combination with a pilot valve having a reciprocable plunger and a cam roller in operative relationship with said plunger, a float operated pilot valve control comprising a cam shaft, a yoke mounted on said shaft, a cam mounted on said yoke in contact with said cam roller, a float, means associated with said float for rotating said cam shaft in response to change in condition of a liquid level, and means for varying the angular position of said cam about the axis of said shaft, while maintaining it in fixed relationship with said yoke.

2. In combination with a pilot valve having a reciprocable actuating plunger and a cam roller in operative relationship with said plunger, said pilot valve being adapted for rotation in a bracket, a float operated pilot valve control comprising a cam shaft, a cam mounted on said shaft in contact with said cam roller, a float, a float arm carrying said float and keyed to said shaft, a collar detachably connected to said shaft, a yoke detachably connected to said collar and means for detachably connecting said cam to said yoke, said shaft with said float attached thereto being capable of rotation through an arc of 180 degrees when said collar is detached from said shaft to permit the positioning of said float on either side of said shaft and said cam being capable of being reversed in position when the position of said yoke is reversed whereby the control may be attached to a container lying on either side thereof.

3. In combination with a pilot valve having a reciprocable actuating plunger and a cam roller in fixed operative relationship with said plunger, a float operated pilot valve control comprising a housing, a flange on said housing intermediate its ends adapted for connection to a container for liquids, bearings adjacent the ends of said housing on opposite sides of said flange, a cam shaft mounted on said bearings and extending therebeyond, a float carrying arm keyed to one end of said cam shaft, a toothed collar keyed to said shaft beyond the end of the housing opposite to the end adjacent to which the float arm is connected, a detachable toothed collar with its teeth engaging the teeth on the fixed collar also mounted on said shaft, means for holding the detachable collar with its teeth in engagement with the teeth on the fixed collar, a yoke detachably connected to the movable collar, said yoke being adated to be turned side for side and connected to said movable collar in either position, a slot and a hole in said yoke, a cam, in engagement with said cam roller, means for pivoting said cam to said yoke for movement about the axis of said hole, said movement being limited by the dimensions of said slot, said cam being adapted to be turned end for end, and means for limiting the oscillations of said cam shaft.

4. In combination with a pilot valve having e reciprocable actuating plunger, and a cam roller in fixed operative relationship with said plunger, a float operated pilot valve control comprising a housing, a flange on said housing intermediate its ends adapted for connection to a container for liquids, bearings adjacent the ends of said housing on opposite sides of said flange, a cam shaft mounted in said bearings and extending therebeyond, a float carrying arm keyed to one end of said cam shaft, a collar detachably connected to the end opposite to which the float arm is connected, a yoke detachably connected to said collar, a slot and a hole in said yoke, a cam, in engagement with said cam roller and means for pivoting said cam to said yoke for movement about the axis of said hole.

5. In combination with a pilot valve having a reciprocable actuating plunger, and a cam roller in fixed operative relationship with said plunger, a float operated pilot valve control comprising a cam shaft, a float carrying arm keyed to one end of said cam shaft, a collar connected to said shaft, a yoke detachably connected to said collar, said yoke having flat parallel surfaces and capable of being turned side for side, means for connecting said yoke in either position to said collar, a slot and a hole in said yoke, a cam, in operative relationship with said cam roller, said cam having flat parallel sides and being adapted to be turned end for end and means for pivoting said cam to said yoke in either position for movement about the axis of said hole, said movement being limited by the dimensions of the slot.

6. In combination with a pilot valve having a reciprocable actuating plunger and a cam roller in fixed operative relationship with said plunger, a float operated pilot valve control comprising a housing, a flange on said housing intermediate its ends adapted for connection to a liquid container, a cam shaft mounted in said housing, a float carrying arm keyed to said cam shaft, a collar connected to said shaft beyond the end of the housing opposite to the end adjacent to which the float arm is connected, a cam in operative relationship with said cam roller, a bracket extending above said housing adjacent the end of the shaft carrying said cam, opposed spaced screws mounted in said bracket and a finger extending above said collar and positioned between the ends of said screws whereby overrunning of said cam and cam shaft is prevented.

7. In a device of the character described, the combination with a cam member and a pilot valve having a movable actuating element in operative relationship with said cam member, of a rotatable float operated shaft carrying a supporting member for said cam member on which said cam member is removably mounted with its surface transverse the axis of said shaft, one of said members having a path of adjustment for said removable mounting transverse the axis of said shaft, said supporting member being detachably mounted on said shaft to enable said shaft and operating float to be rotated through an arc of 180 degrees when said support mounting is detached to permit the positioning of said float on either side of said shaft, said cam being capable of being reversed in position on said supporting member when the position of said supporting member is reversed whereby the device may be attached to a container lying on either side thereof, and means for securing said movably mounted cam member in its adjusted position.

8. In a device of the character described, the combination with a rotatable float operated shaft and a cam member in operative relationship therewith, of a pilot valve having a movable actuating member, a motion transmitting lever having a member for contacting said cam and a member for contacting said pilot actuating member, a support on which said lever is fulcrumed, resilient means for maintaining said cam contact member in operative relationship with said cam, and means for adjusting the relative position of said cam contact member and said pilot actuating member whereby the setting of said pilot actuating member relative to said float may be varied.

9. In combination with a valve adapted to control the supply of liquid in a container, a valve control mechanism comprising a shaft, means responsive to a change in the liquid level in said container for oscillating said shaft, means operatively interposed between said shaft and said valve for maintaining a constant flow of liquid into said container during a portion of a range of movement of said shaft, means for increasing the flow during another portion of said range of movement, means for decreasing the flow during a third portion of said range of movement, and means for varying the extent of any of said ranges of movement.

10. The combination with a container for liquid and a float in said container movable in response to variations in level of liquid in said container, of means responsive to said float for effecting small variations of the liquid level in said container within a selected range and wide variations of the liquid level in said container within predetermined ranges above and below said selected range and means for varying the total extent of the three ranges.

11. The combination with a container for liquid and a float in said container movable in response to variations in level of liquid in said container, of means responsive to said float for effecting small variations of the liquid level in said container within a selected range and wide variations of the liquid level in said container within a predetermined range adjacent said selected range and means for varying the extent of said ranges with respect to each other.

12. In a device of the character described, the combination with a cam member and a pilot valve having a movable actuating element in operative relationship with said cam member, of a rotatable float operated shaft carrying a supporting member for said cam member on which said cam member is removably mounted with its surface transverse the axis of said shaft, said cam member having a path of adjustment with respect to said removable mounting transverse the axis of said shaft, said supporting member being detachably mounted on said shaft to enable said shaft and operating float to be rotated through an arc of 180 degrees when said mounting is detached to enable said float to be positioned on either side of said shaft, said cam also being capable of being reversed in position on said supporting member when the position of said supporting member is reversed whereby the device may be attached to a container lying on either side thereof, and means for securing said movably mounted cam member in its adjusted position.

13. In a device of the character described, the combination with a rotatable float operated shaft and a pilot valve having a movable actuating element, of a cam in operative relationship with said actuating element, a supporting yoke for said cam, a pivot pin for mounting said cam on said supporting yoke secured to one of said last mentioned members, said pivot having its axis parallel to the axis of said shaft and said cam having its cam surface transverse to the axis of said shaft, said yoke and said cam each having a slot, the slot in one of said members engaging the pivot pin secured to the other of said members and the slot in the other member being concentric with said pivot pin, and means for securing said cam in its adjusted position.

14. In a device of the character described, the combination with a rotatable float operated shaft and a pilot valve having a movable actuating element, of a cam supported on said shaft having a continuing operating surface with a heel at one end which accelerates the actuating element, an auxiliary member detachably connected to said cam accelerating the pilot action, said auxiliary member being adjustable relative to the heel of said cam to provide variable limits of accelerated pilot action and means for adjusting said cam to vary the amount of pilot action between said selected limits.

15. In combination with a pilot valve having a movable actuating plunger and a cam roller in operative relationship with said plunger, said pilot valve being adapted for rotation in a bracket, a float operated pilot valve control comprising a cam shaft, a cam mounted on said shaft in contact with said roller, a float, a float arm carrying said float secured to said shaft, a collar detachably connected to said shaft, a yoke detachably connected to said collar and means for detachably connecting said cam to said yoke, said shaft with said float attached thereto being capable of rotation when said collar is detached from said shaft to permit the positioning of said float on either side of said shaft and said cam being capable of being reversed in position when the position of said yoke is reversed whereby the control may be attached to a container lying on either side thereof.

16. In combination with a pilot valve having a movable actuating element and a follower in operative relationship with said element, a float operated pilot valve control comprising a cam shaft, a yoke mounted on said shaft, a cam maintained on said yoke in contact with said follower, a float, means associated with said float for rotating said shaft in response to change in liquid level, and means for varying the angular position of said cam about the axis of said shaft while maintaining it in fixed relationship with said yoke.

17. In a device of the character described, the combination with a rotatable float operated cam shaft, of a cam, a fixed pivot for said cam positioned in parallelism with the axis of said cam shaft, means for maintaining said cam in any one of a multiplicity of radial positions about said pivot and means for independently maintaining said cam in any one of a multiplicity of centric relationships with respect to said pivot.

EDWARD T. DAHL.